(12) United States Patent
Yamada (10) Patent No.: US 8,059,437 B2
(45) Date of Patent: Nov. 15, 2011

(54) INTEGRATED CIRCUIT AND DC-DC CONVERTER FORMED BY USING THE INTEGRATED CIRCUIT

(75) Inventor: Kouhei Yamada, Matsumoto (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 546 days.

(21) Appl. No.: 11/889,346

(22) Filed: Aug. 10, 2007

(65) Prior Publication Data

US 2008/0068867 A1    Mar. 20, 2008

(30) Foreign Application Priority Data

Aug. 10, 2006  (JP) .................................. 2006-219016

(51) Int. Cl.
*H02M 1/00* (2007.01)

(52) U.S. Cl. ..................... 363/147; 438/381; 257/508

(58) Field of Classification Search .................. 363/147; 438/381, 391; 257/506, 516, 659
See application file for complete search history.

(56) References Cited

U.S. PATENT DOCUMENTS

| 4,683,438 | A | * | 7/1987 | Hauenstein | .................... 323/288 |
| 5,715,287 | A | * | 2/1998 | Wadhawan et al. | ........... 375/377 |
| 5,811,882 | A | * | 9/1998 | Latham et al. | ................. 257/776 |
| 6,066,537 | A | * | 5/2000 | Poh | ............................... 438/393 |
| 6,747,441 | B2 | * | 6/2004 | Johnson et al. | ................ 323/282 |
| 2004/0173852 | A1 | * | 9/2004 | Fujimori | ......................... 257/357 |
| 2005/0030803 | A1 | * | 2/2005 | Forbes et al. | .................. 365/202 |

FOREIGN PATENT DOCUMENTS

| JP | 63-029962 |   | 2/1988 |
| JP | 63186447 A | * | 8/1988 |
| JP | 7-30064 |   | 1/1995 |

* cited by examiner

*Primary Examiner* — Harry Behm
(74) *Attorney, Agent, or Firm* — Rabin & Berdo, P.C.

(57) ABSTRACT

An integrated circuit, in which the influence of parasitic capacitance between a semiconductor substrate and a resistor and between the semiconductor substrate and a capacitor can be inhibited, and a DC-DC converter provided with the integrated circuit. A shielding layer of an n-type semiconductor is formed between a p-type semiconductor substrate and a resistor formed thereon and between the semiconductor substrate and a capacitor formed thereon. A point BOOT is connected to the shielding layer, at which an electric potential changes in the same way as a change in the reference potential of a functional circuit carrying out a specified operation by using the resistor and the capacitor.

6 Claims, 6 Drawing Sheets

INTEGRATED CIRCUIT AND DC-DC CONVERTER FORMED BY USING THE INTEGRATED CIRCUIT

BACKGROUND OF THE INVENTION

1. Field of the Invention

The present invention relates to an integrated circuit in which elements formed with semiconductors are formed on a semiconductor substrate, and particularly to a DC-DC converter formed by using the integrated circuit.

2. Description of the Background Art

Figure 5:
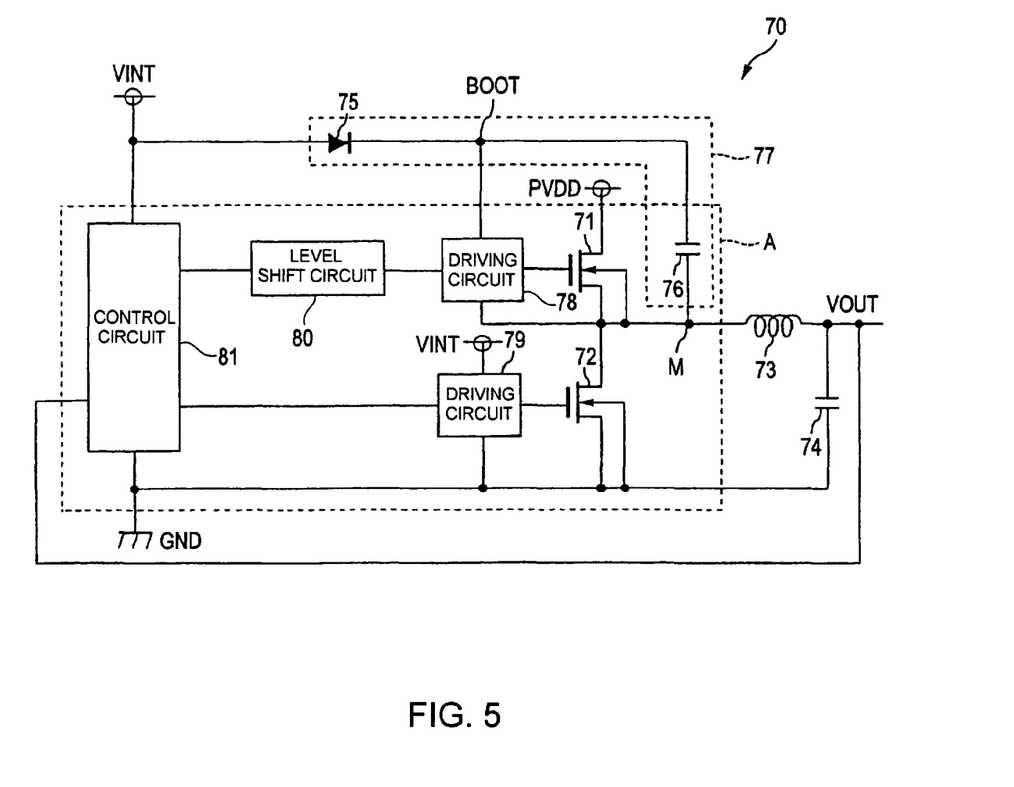
FIG. 5 is a diagram showing an existing DC-DC converter.

FIG. 5 is a diagram showing an existing DC-DC converter. The DC-DC converter 70 shown in FIG. 5 is a dropper type DC-DC converter in which an n-channel MOSFET (Metal Oxide Semiconductor Field Effect Transistor) is used on the high side. The DC-DC converter 70 is formed by including an n-channel MOSFET 71 on the high side with a drain terminal to which an input voltage PVDD is applied, an n-channel MOSFET 72 on the low side with a drain terminal which is connected to the source terminal of the MOSFET 71, a coil 73 connected to the connecting point of the MOSFET 71 and the MOSFET 72, a capacitor 74 provided between the coil 73 and the ground GND, a bootstrap circuit 77 formed of a diode 75 and a capacitor 76, a driving circuit 78, a driving circuit 79, a level shift circuit 80 and a control circuit 81 which outputs specified signals to the level shift circuit 80 and the driving circuit 79 on the basis of an output voltage VOUT applied to the capacitor 74.

The control circuit 81 is operated with the electric potential of GND taken as a reference potential. Moreover, the level shift circuit 80, on the basis of a specified signal outputted from the control circuit 81, outputs a specified signal to the driving circuit 78. The driving circuit 78 can be formed with a circuit such as an overcurrent protection circuit provided therein and outputs a driving signal to the MOSFET 71 on the basis of the specified signal outputted from the level shift circuit 80. The driving circuit 79 outputs a driving signal to the MOSFET 72 on the basis of a specified signal outputted from the control circuit 81.

The DC-DC converter 70 switches the MOSFETs 71 and 72 to be alternately turned-on and -off to thereby make the input voltage PVDD drop to the output voltage VOUT with a specified magnitude. Namely, with the MOSFET 71 made turned-on and the MOSFET 72 made turned-off, energy is stored in the coil 73. With the MOSFET 71 made turned-off and the MOSFET 72 made turned-on, the energy stored in the coil 73 is released. By adjusting the respective duty ratios for which the MOSFET 71 and 72 are turned-on and -off, the energy stored in the coil 73 is controlled to make the output voltage VOUT equal to a target voltage.

In the DC-DC converter 70, the use of the n-channel MOSFET 71 on the high side necessitates applying a voltage higher than the input voltage PVDD to the driving circuit 78 when driving the MOSFET 71. Therefore, in the DC-DC converter 70, to apply a voltage higher than the input voltage PVDD to the driving circuit 78, the bootstrap circuit 77 is used. The bootstrap circuit 77 is a circuit that gives an approximately constant voltage to the driving circuit 78 with the electric potential of the source electrode of the MOSFET 71 (the electric potential of the point M shown in shown in FIG. 5) taken as a reference potential. In FIG. 5, a frame A marked by a broken line shows a module that can be formed as an integrated circuit.

Figure 6:
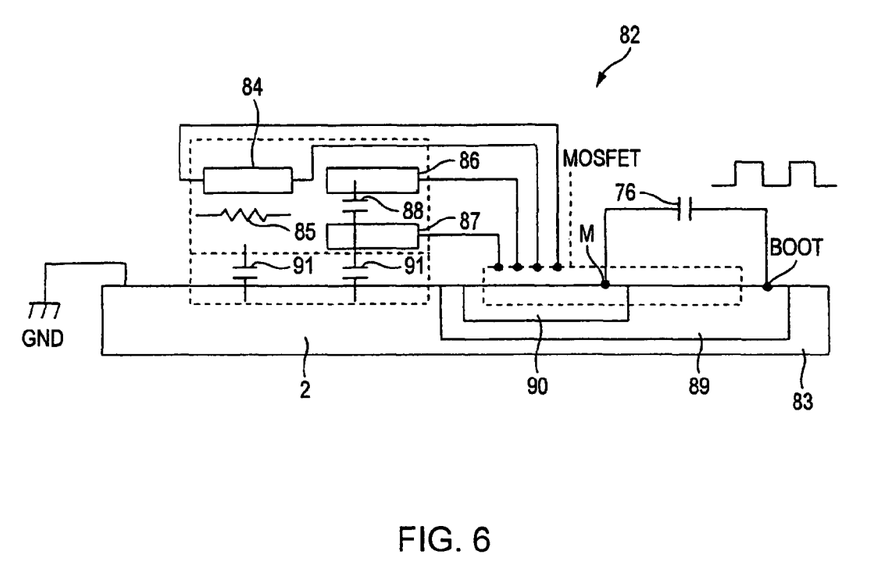
FIG. 6 is a diagram showing an existing integrated circuit.

Circuit elements such as resistors and capacitors formed in an integrated circuit are formed on a semiconductor substrate by using a semiconductor such as polysilicon. FIG. 6 is a diagram showing an existing integrated circuit. In the circuit configuration shown in FIG. 6, the same constituents as those shown in FIG. 5 are designated by the same reference numerals and signs as those in FIG. 5.

An integrated circuit 82 shown in FIG. 6, is formed by including a p-type semiconductor substrate 83, a resistor 85 formed on the semiconductor substrate 83 with a polysilicon film 84, a capacitor 88 formed on the semiconductor substrate 83 by polysilicon films 86 and 87 and an insulator layer (not shown) between them. The semiconductor substrate 83 is to be connected to ground GND, an n-type semiconductor layer 89 is selectively formed on the top surface of the semiconductor substrate 83, and further, a p-type semiconductor layer 90 is selectively formed on the surface of the semiconductor layer 89. Moreover, one of the terminals (the point BOOT also shown in FIG. 5) of the capacitor 76 is connected to the semiconductor layer 89, and the other terminal (the point M also shown in FIG. 5) of the capacitor 76 is connected to the semiconductor layer 90. In addition, although not shown in FIG. 6, besides the resistor 85 and the capacitor 88, the elements such as the MOSFETs 71 and 72 and the driving circuits 78 and 79 are also to be formed in the integrated circuit 82.

In thus formed integrated circuit 82, as shown in FIG. 6, parasitic capacitance 91 is adjunctively formed to some extent between the semiconductor substrate 83 and the resistor 85 and between the semiconductor substrate and the capacitor 88.

The parasitic capacitance 91 causes two problems. The first one is that noise accompanying operation of a number of circuit elements formed on the semiconductor substrate 83 and noise superimposed on a power source voltage supplied externally enter the resistor 85, the capacitor 88 and the driving circuits 78 and 79 from the semiconductor substrate 83 through the parasitic capacitance 91.

The second problem occurs when the driving circuit 78 shown in FIG. 5 is formed by using the resistor 85 and the capacitor 88 in the integrated circuit 82, for example. The problem is that each change in the electric potential at the point M accompanied by the turning on-and-off operation of the MOSFETs 71 and 72 (the electric potential at the point BOOT as the potential of the power source for the driving circuit 78 also changes with the change at the point M) causes large noise signals, equivalent to a voltage applied with an amplitude between the input voltage PVDD and GND, to enter the driving circuit 78, with the parasitic capacitance 91 made functioned as a coupling capacitance, which may prevent normal operation of the DC-DC converter 70.

To counteract the first problem, there is a proposal in which a shielding layer of an n-type semiconductor is provided in each of the region between the semiconductor substrate 83 and the resistor 85 and the region between the semiconductor substrate 83 and the capacitor 88, and the shielding layer is connected to the power source or GND at a fixed electric potential to thereby shield the resistor 85 and the capacitor 88 from noise from the semiconductor substrate 83 (see JP-A-7-30064 (paragraphs 0010 to 0012, and FIG. 1) or JP-A-63-29962 (pages 3 to 4, and FIGS. 1 to 3, 5 and 6), for example)).

However, the arrangement proposed in JP-A-7-30064 or JP-A-63-29962, in which a shielding layer is provided in each of the region between the semiconductor substrate 83 and the resistor 85 and the region between the semiconductor substrate 83 and the capacitor 88 and, along with this, the shielding layer is connected to the power source or GND, can only deal with the first problem but can not solve the second problem. Specifically, there is no difference between the proposed arrangement and that of the existing one in as much as a coupling capacitance is present between a circuit with its reference potential changed and a region at a fixed electric potential (the semiconductor substrate). Therefore, a large amount of noise enters the driving circuit 78 along with the switching operation of the MOSFETs 71 and 72.

Accordingly, the invention has an object of providing an integrated circuit that can solve the two problems caused by the parasitic capacitance between the semiconductor substrate and the elements, particularly the second problem, which could not previously be solved, and a DC-DC converter formed by using such an integrated circuit.

SUMMARY OF THE INVENTION

In order to solve this problem, the following arrangement was adopted in the invention. Namely, an integrated circuit according to the invention includes a semiconductor substrate; a shielding layer formed with a diffused layer formed in the semiconductor substrate, or a conductive film or a metal film formed on the semiconductor substrate; an element formed on the shielding layer; and a functional circuit carrying out a specified operation with the use of the element. The shielding layer is connected to a reference potential of the functional circuit or to an electric potential changing with a change in the reference potential.

By thus forming the shielding layer between the semiconductor substrate and the elements and by connecting the shielding layer to the reference potential of the functional circuit carrying out the specified operation by using the elements or to the electric potential changing with the change in the reference potential, it is possible to prevent a signal equivalent to noise (a noise signal) from entering the functional circuit through parasitic capacitance when the reference potential changes. Moreover, it is also possible to shield other noise from the semiconductor substrate.

A DC-DC converter according to a preferred embodiment of the invention includes an n-channel MOS transistor with a drain terminal to which an input voltage is applied; a coil connected to a source terminal of the MOS transistor; a capacitor connected to the coil to which capacitor an output voltage is applied; and a functional circuit provided with the element formed on the shielding layer and connected to a gate terminal of the MOS transistor, where the MOS transistor is driven by the functional circuit to obtain a specified output voltage from the input voltage.

This can inhibit noise entering the driving circuit of the MOS transistor (the functional circuit) to reduce malfunctions of the MOS transistor, which makes it possible to stably operate the DC-DC converter.

In the DC-DC converter, a bootstrap circuit may further be included in which a reference potential thereof is taken as the electric potential of the source terminal of the MOS transistor, the functional circuit (driving circuit) is operated with an electric potential of a high electric potential side of a power source thereof taken as an electric potential on a high electric potential side of the bootstrap circuit and an electric potential of a low electric potential side of the power source thereof taken as the reference potential, and the shielding layer is connected to the reference potential or the high electric potential of the bootstrap circuit.

The DC-DC converter may further include an overcurrent protection circuit formed with a second one of the element provided for preventing an overcurrent from flowing in the MOS transistor, where a reference potential of the overcurrent protection circuit is connected to the reference potential of the bootstrap circuit.

This can inhibit a noise signal entering the overcurrent protection circuit to make it possible to prevent the overcurrent protection circuit from malfunctioning, which makes it possible to stably operate the DC-DC converter.

According to a preferred embodiment of the invention, in an integrated circuit, the influence of parasitic capacitance between a semiconductor substrate and elements, particularly the influence, when the reference potential is changed of the functional circuit that carries out a specified operation by using the elements, can be inhibited. Thus, when a driving circuit of a MOS transistor on the high side, which circuit is provided in a DC-DC converter, is formed by using the integrated circuit, it is possible to stably operate the DC-DC converter.

DESCRIPTION OF THE PREFERRED EMBODIMENTS

Figure 1:
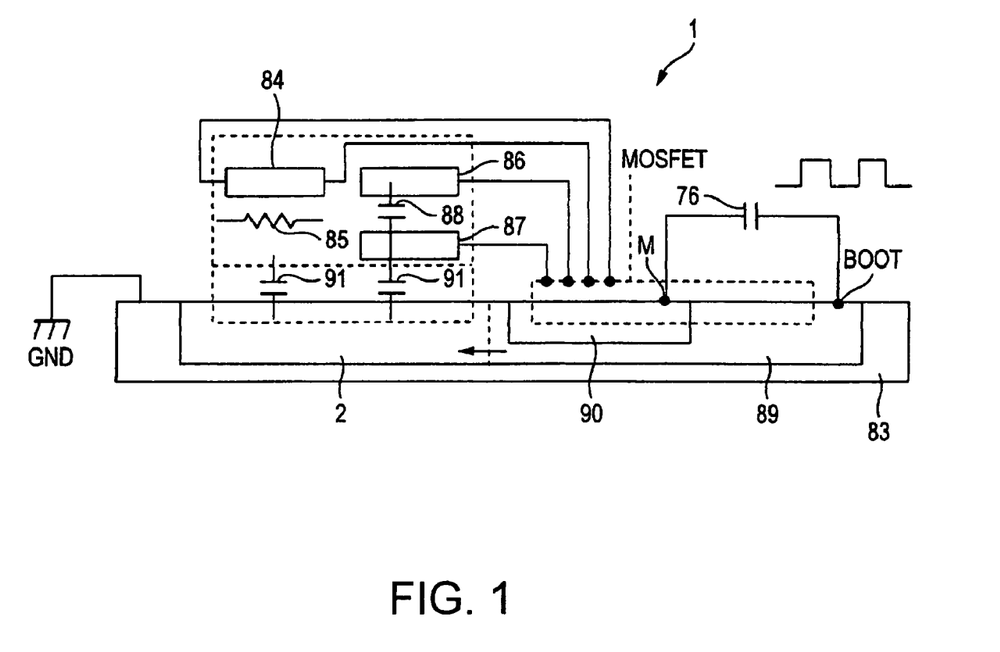
FIG. 1 is a diagram showing an example of an integrated circuit according to an embodiment of the invention.

In the following description, a preferred embodiment of the invention will be explained with reference to the drawings. FIG. 1 is a diagram showing an example of an integrated circuit according to an embodiment of the invention. In the arrangement shown in FIG. 1, the same constituents as those shown in FIG. 5 and FIG. 6 are designated by the same reference numerals and signs as those in FIG. 5 and FIG. 6.

An important point of the integrated circuit 1 shown in FIG. 1 is that a shielding layer 2 made of an n-type semiconductor is formed between a semiconductor substrate 83 and a resistor 85 (specifically, between the semiconductor substrate 83 and a polysilicon film 84) and between the semiconductor substrate 83 and a capacitor 88 (specifically, between the semiconductor substrate 83 and a polysilicon film 87) and that the shielding layer 2 is connected either to a reference potential of a functional circuit connected to the resistor 85 and the capacitor 88, or to an electric potential that changes with the change in the reference potential. In the example shown in FIG. 1, a semiconductor layer 89 connected to a point BOOT (the electric potential at this point changes with the change in the electric potential at the point M, which is the reference potential of a driving circuit 78) is extended to below the resistor 85 and the capacitor 88, thus forming the shielding layer 2. This allows the electric potential of the shielding layer 2 to be an electric potential that changes with the change in the electric potential at the point M, which is the reference potential of the driving circuit 78. Moreover, the shielding layer 2 can be formed together with the semiconductor layer 89 in the process of forming the semiconductor layer 89. In this preferred embodiment, the driving circuit 78 equivalent to that shown in FIG. 5 and an overcurrent protection circuit 4 that will be explained later are formed as part of the integrated circuit. However, a circuit formed by using the integrated circuit 1 is not limited to this.

The shielding layer 2 can be formed by extending a semiconductor layer 90 together with the semiconductor layer 89 to below the resistor 85 and the capacitor 88. This connects the shielding layer 2 to the point M so that the reference potential of the driving circuit 78 is the electric potential of the shielding layer 2.

Moreover, the shielding layer 2 can be formed independently of the semiconductor layers 89 and 90 as a separate conductive film or metal film. When the shielding layer 2 is thus formed, the shielding layer 2 and the semiconductor layer 89 or 90 must be electrically connected at specified places.

An element such as an output pad, which is connected to a circuit operated by a voltage between the point BOOT and the point M, can be the element formed on the semiconductor substrate 83. Therefore, the element is not limited to the resistor 85 or the capacitor 88.

An element such as an IGBT (Insulated Gate Bipolar Transistor) can be used as a switching element on the high side of a DC-DC converter formed by using the integrated circuit 1. Therefore, the switching element is not limited to a MOSFET.

By thus forming the shielding layer 2 between the semiconductor substrate 83 and the resistor 85 and between the semiconductor substrate 83 and the capacitor 88 and connecting the shielding layer 2 to the point BOOT, the electric potential of the shielding layer 2 is brought to the electric potential of the point BOOT. This can prevent noise from entering a circuit, in which the electric potential of the point BOOT is taken as that of a high electric potential side of a power source, and the electric potential of the point M is taken as that of a low electric potential side of the power source, through parasitic capacitance 91. Therefore, occurrences of malfunctions of the MOSFET 71 are reduced to make it possible to stably operate the DC-DC converter 70.

Figure 2:
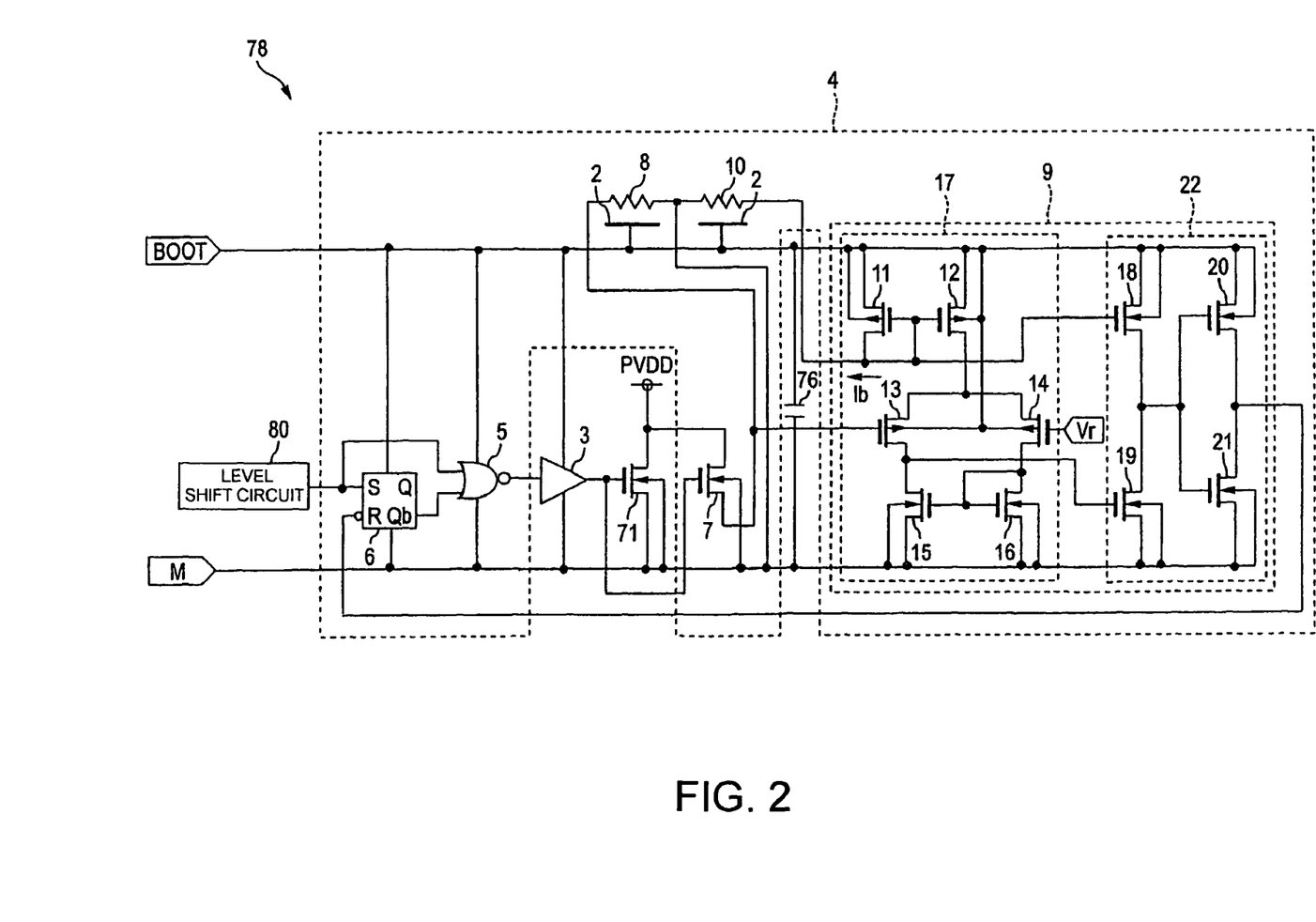
FIG. 2 is a diagram showing a driving circuit formed by using the integrated circuit of FIG. 1.

FIG. 2 is a diagram showing the driving circuit 78 formed by using the integrated circuit 1. In the configuration shown in FIG. 2, the same constituents as those shown in FIG. 5 are designated by the same reference numerals and signs as those in FIG. 5. The driving circuit 78 shown in FIG. 2 is formed by providing a driver 3 outputting a driving signal to a MOSFET 71 and an overcurrent protection circuit 4. The overcurrent protection circuit 4, when detecting that an overcurrent flows in the MOSFET 71, turns the MOSFET 71 off and maintains the turned-off state until the next switching period.

The overcurrent protection circuit 4 is formed by providing a NOR gate 5 outputting a pulse signal to the driver 3, an R-S flip-flop 6 outputting a pulse signal to one of the input terminals of the NOR gate 5, a MOSFET 7 connected to the MOSFET 71 to form a current mirror circuit together with the MOSFET 71 for detecting the current flowing in the MOSFET 71, a resistor 8 provided between the source terminal of the MOSFET 7 and the point M, a comparator 9 to which a voltage across the resistor 8 between the source terminal of the MOSFET 7 and the point M is inputted and, along with this, the reference voltage Vr are inputted, and a resistor 10 one end of which is connected to the point M to be at the electric potential of the point M for letting a bias current Ib flow in the comparator 9. The gate width of the MOSFET 7 is sufficiently smaller than the gate width of the MOSFET 71. Moreover, a level shift circuit 80 shown in FIG. 2 is for shifting the level of a signal supplied from the control circuit 81 shown in FIG. 5 so as to be suitable for the driving circuit 78 and outputting the level-shifted signal to the set terminal S of the R-S flip-flop 6 and to the other input terminal of the NOR gate 5. The circuit configuration of the level shift circuit 80 will be explained in detail later. In FIG. 2, elements making up the DC-DC converter 70 shown in FIG. 5 other than the driving circuit 78 and the level shift circuit 80 (elements such as the MOSFET 72 and the coil 73, for example) are to be omitted.

In the driving circuit 78 shown in FIG. 2, the resistor 10, for example, has a resistance value of approximately several hundreds of kilo-ohms and is formed of polysilicon with high sheet resistance on the semiconductor substrate 83 like the resistor 85 in the integrated circuit shown in FIG. 1. Moreover, a shielding layer 2 is to be formed between the semiconductor substrate 83 and the resistor 10. Similarly, the resistor 8 is to be also formed of polysilicon on the semiconductor substrate 83 and, between the semiconductor substrate 83 and the resistor 8, a shielding layer 2 is to be formed. This allows the whole driving circuit 78 shown in FIG. 2 to be formed as a circuit in the integrated circuit 1.

The comparator 9 is formed by providing a differential amplifier circuit 17 formed of MOSFETs 11 to 16 and an output buffer circuit 22 formed of MOSFETs 18 to 21. The output voltage of the differential amplifier circuit 17, namely the output voltage at the connection point of the MOSFETs 13 and 15 is outputted to the reset terminal R of the R-S flip-flop 6 through the output buffer circuit 22.

Of the signals outputted from the level shift circuit 80 to the NOR gate 5 and the R-S flip-flop 6, a low level signal becomes a signal instructing turning-on of the MOSFET 71 and a high level signal becomes a signal for setting the R-S flip-flop. According to PWM control, a low level pulse is inputted to the NOR gate 5 and the set terminal S of the R-S flip-flop 6 with a timing for turning the MOSFET 71 on. A signal for turning the MOSFET 71 off according to the PWM control corresponds to an output signal of a MOSFET 31 forming the level shift circuit 80 that will be explained later. Actually, a signal inputted to the reset terminal R of the R-S flip-flop 6 is a signal as a result of an AND operation of the output signal of the output buffer circuit 22 and a PWM signal for driving the MOSFET 71 under PWM control. However, since FIG. 2 is for explaining the overcurrent protection circuit 4, the illustration of the circuit for carrying out the AND operation of the PWM signal for driving the MOSFET 71 under PWM control and the output signal of the output buffer circuit 22 is omitted. It is the set terminal S of the R-S flip-flop 6 that the signal outputted from the level shift circuit 80 is first inputted. The set terminal S becomes positive logic (high active). Namely, when the level of a signal inputted to the set terminal S becomes a high level, the level of the signal outputted from the output terminal Q of the R-S flip-flop 6 becomes a high level and the level of the signal outputted from the output terminal Qb becomes a low level, while the reset terminal R becomes negative logic (low active). Thus, when the level of a signal inputted to the reset terminal R becomes a low level, the level of the signal outputted from the output terminal Q becomes the low level and the level of the signal outputted from the terminal Qb becomes the high level.

Next, also referring to FIG. 2, the operation of the driving circuit 78 when the MOSFET 71 is turned on will be explained. Firstly, when the level of the signal, outputted from the level shift circuit 80 to the set terminal S of the R-S flip-flop 6, becomes the high level, a low level signal is outputted from the output terminal Qb of the R-S flip-flop 6. When the level of the output signal of the level shift circuit 80 becomes a low level with the low level signal being outputted from the output terminal Qb of the R-S flip-flop 6, the level of the signal outputted from the NOR gate 5 becomes the high level and the level of a driving signal outputted from the driver 3 also becomes a high level to make the MOSFET 71 turned-on. At this time, the MOSFET 7 is also turned on. Thereafter, when the level of the output signal of the level shift circuit 80 becomes the high level, the level of the signal outputted from the NOR gate 5 becomes the low level to make the MOSFET 71 and the MOSFET 7 turn off.

Now, the operation of the driving circuit 78 when the voltage across the resistor 8 becomes higher than the reference voltage Vr at turning-on of the MOSFET 7 in FIG. 2 will be explained. The reference voltage Vr is to be set so as to be equal to the voltage across the resistor 8 shortly before the current flowing in the MOSFET 71 becomes an overcurrent, for example.

Firstly, the MOSFET 7 is made turned-on, so that the voltage across the resistor 8, inputted to the gate terminal of the MOSFET 13 in the differential amplifier circuit 17, becomes higher than the reference voltage Vr inputted to the gate terminal of the MOSFET 14 in the differential amplifier circuit 17. Thus, the electric potential at the connection point of the MOSFETs 13 and 15 in the differential amplifier circuit 17 becomes low level one to also make the electric potential at the connection point of the MOSFETs 20 and 21 in the output buffer circuit 22 low level one.

With the electric potential at the connection point of the MOSFETs 20 and 21 of the output buffer circuit 22 made low level one, the level of a signal inputted to the reset terminal R of the R-S flip-flop 6 to becomes the low level, which makes the level of the pulse signal outputted from the output terminal Qb of the R-S flip-flop become the high level. Then, the level of the pulse signal outputted from the NOR gate is made to become the low level to bring the level of the driving signal outputted from the driver 3 to also become the low level, which makes the MOSFET 71 turn off. This prevents an overcurrent from flowing in the MOSFET 71 to make it possible to protect the MOSFET 71 from an overcurrent. After this, when the level of the signal outputted from the level shift circuit 80 to the set terminal S of the R-S flip-flop 6 becomes the high level (since the MOSFET 71 and the MOSFET 7 are turned off at this time, the level of the signal inputted to the reset terminal R of the R-S flip-flop 6 is the high level), the level of the output signal from the output terminal Qb of the R-S flip-flop 6 becomes the low level. Then, when the level of the output signal of the level shift circuit 80 becomes the low level, the level of the signal outputted to the NOR gate 5 becomes the high level to make the MOSFET 71 and the MOSFET 7 turn on again.

For example, in the case in which the resistor 10 in the driving circuit 78 shown in FIG. 2 is formed on the semiconductor substrate 83 without the shielding layer 2 provided between the resistor 10 and the semiconductor substrate 83 in the integrated circuit 1 shown in FIG. 1, the semiconductor substrate 83 and the resistor 10 are directly coupled by the parasitic capacitance 91. This makes the MOSFET 71 turn on to raise the electric potential at the point M, which greatly increases a bias current Ib to bring the level of the output signal of the comparator 9 to the low level. Thus, there is the possibility of making the MOSFET 71 turn off, causing the MOSFET 71 to malfunction. Similarly, also in the case in which the resistor 8 is formed on the semiconductor substrate 83 without the shielding layer 2 provided between the resistor 8 and the semiconductor substrate 83, there is the possibility that a large noise signal with a voltage amplitude between the input voltage PVDD and GND is inputted to the differential amplifier circuit 17 through the parasitic capacitance 91 and transmitted to the output of the comparator 9 to cause the MOSFET 71 to malfunction.

As in the integrated circuit 1 shown in FIG. 1, by forming the resistors 8 and 10 on the semiconductor substrate 3 with the shielding layer 2 provided between and connecting the shielding layer 2 to the point BOOT, the electric potential of the shielding layer 2 is brought to the electric potential of the point BOOT. This, as was explained before, can prevent noise from entering the circuit, where the electric potential of the point BOOT is taken as that of a high electric potential side of a power source and the electric potential of the point M is taken as that of a low electric potential side of the power source, through parasitic capacitance 91. Thus, noise signals mixed in the bias current Ib in the comparator 9 and noise signals mixed in the input signal to the comparator 9 are reduced. Therefore, the occurrence of malfunctions of the overcurrent protection circuit 4 can be prevented to make it possible to stably operate the DC-DC converter 70.

Figure 3:
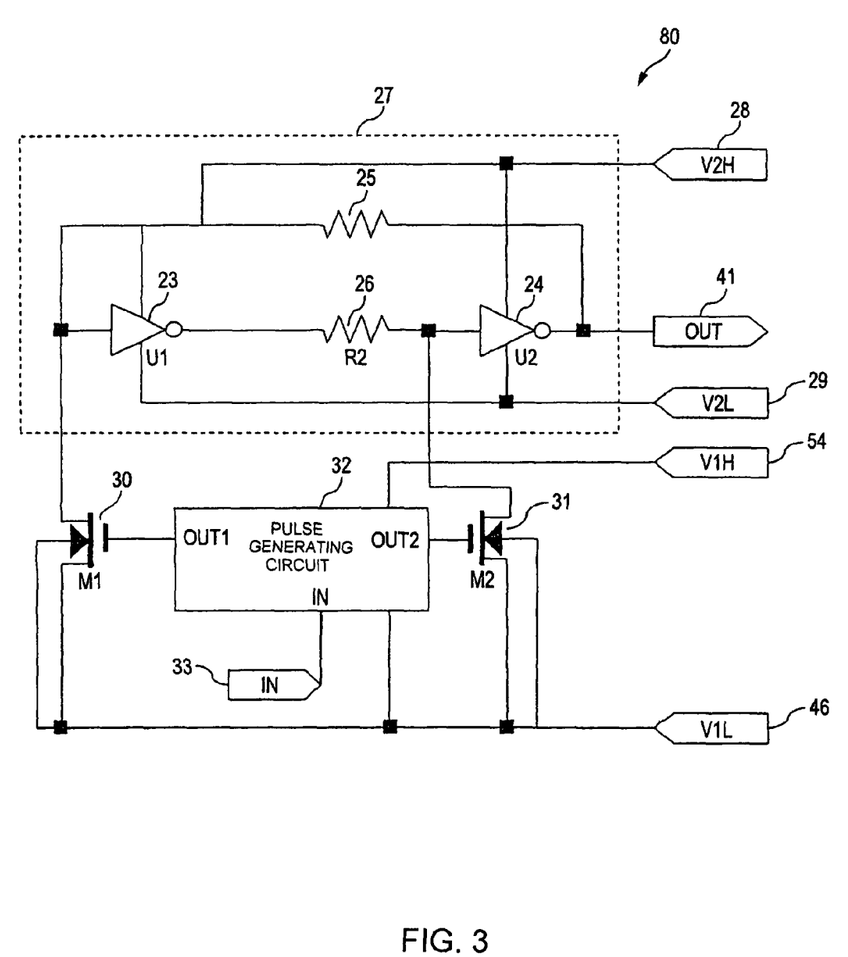
FIG. 3 is a diagram showing a basic configuration of a level shift circuit.

Next, the level shift circuit 80 will be explained. FIG. 3 is a diagram showing a basic configuration of the level shift circuit 80. In FIG. 3, the level shift circuit 80 is provided with a latch circuit 27. The latch circuit 27 has inverters 23 and 24 and resistors 25 and 26. The output side of the inverter 23 is connected to the input side of the inverter 24 through the resistor 26 and the output side of the inverter 24 is connected to the input side of the inverter 23 through the resistor 25. The inverters 23 and 24 are arranged so as to be operated between a high electric potential terminal V2H 28 and a low electric potential terminal V2L 29 of a secondary side power source, that is, a high voltage side power source. The input side of the inverter 23 is also connected to the drain of a MOSFET 30 for driving the latch circuit 27 from a primary side, that is, a low voltage side, and the input side of the inverter 24 is also connected to the drain of a MOSFET 31 for driving the latch circuit 27 from the primary side. Moreover, to make the MOSFETs 30 and 31 perform switching operations, their gates are connected to a pulse generating circuit 32 and its output signals OUT 1 and OUT 2 are inputted to the gates of the MOSFETs 30 and 31, respectively. The pulse generating circuit 32 is arranged to be operated between a high electric potential terminal V1H 54 and a low electric potential terminal V1L 46 of a low electric potential side power source. The pulse generating circuit 32 is a circuit that generates a short pulse at each rising and falling edge of an input signal (IN) 33, and plays the role of a trigger for making the MOSFETs 30 and 31 perform switching operations. This will be explained in detail with reference to FIGS. 4A and 4B.

Figure 4A:
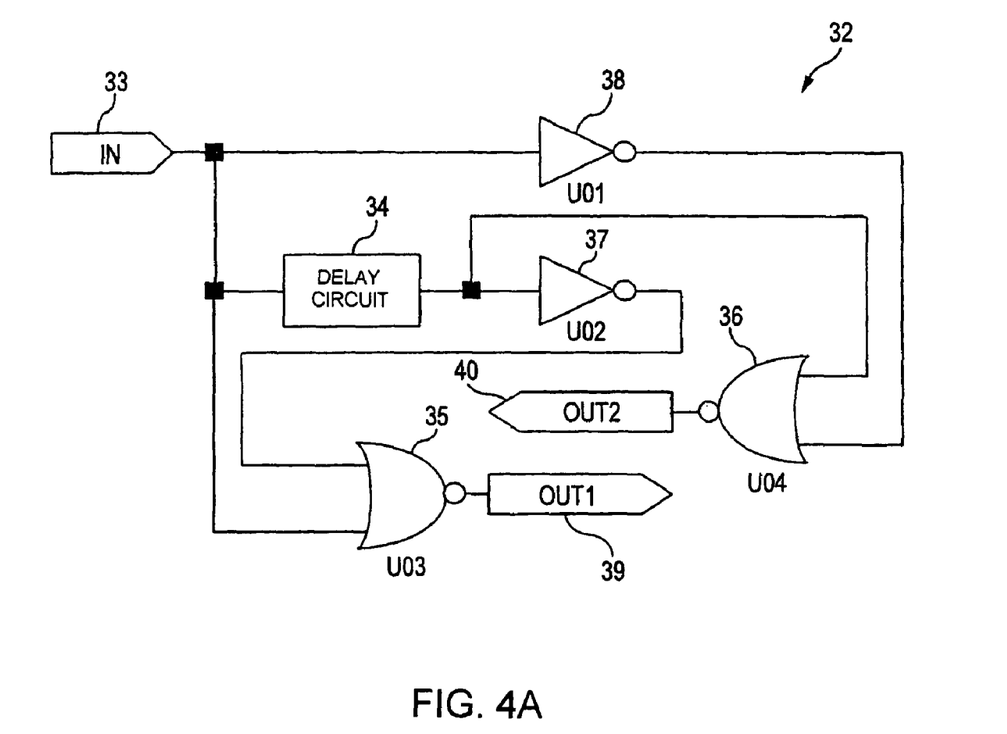
FIG. 4A is a diagram illustrating the configuration of a pulse generating circuit in a level shift circuit.
Figure 4B:
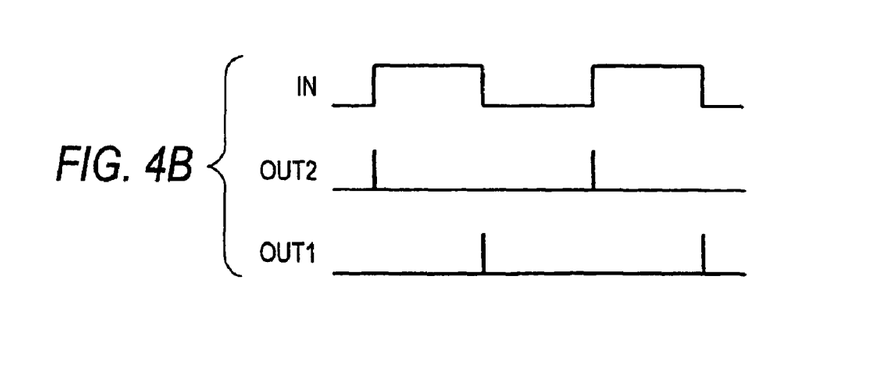
FIG. 4B is a waveform diagram showing timing of an input signal and output signals of the pulse generating circuit of FIG. 4A.

FIG. 4A and FIG. 4B are diagrams illustrating the configuration and the operation of the pulse generating circuit 32 in the level shift circuit 80. As shown in FIG. 4A, the pulse generating circuit 32 in the level shift circuit 80 is made up of a delay circuit 34, NOR circuits 35 and 36 and inverters 37 and 38. The input side of each of the NOR circuit 35, the delay circuit 34 and the inverter 38 is connected to an input terminal for the input signal (IN) 33, the output side of the inverter 38 and the output side of the delay circuit 34 are connected to the input side of the NOR circuit 36, the output side of the delay circuit 34 is also connected to the input side of the inverter 37 and the output side of the inverter 37 is connected to the other input side of the NOR circuit 35. The output of the NOR circuit 35 becomes the output signal (OUT1) 39 to be given to the gate of the MOSFET 30 shown in FIG. 3. Namely, a signal of negation of the logical sum of the input signal (IN) 33 and an inverted signal of a delayed signal of the input signal (IN) 33 is supplied to the gate of the MOSFET 30. Moreover, the output of the NOR circuit 36 becomes the output signal (OUT2) 40 to be fed to the gate of the MOSFET 31 shown in FIG. 3. Namely, a signal of negation of the logical sum of an inverted signal of the input signal (IN) 33 and a delayed signal of the input signal (IN) 33 is fed to the gate of the MOSFET 31. As shown in a waveform diagram in FIG. 4B, in the pulse generating circuit 32, at the rising edge of the input signal (IN) 33, the level change in the input signal (IN) 33 is applied to the inverter 38. Then, the inverted output of the input signal (IN) 33 inverted by the inverter 38 and the delayed output of the input signal (IN) 33 delayed by the delay circuit 34 are applied to the NOR circuit 36, so that a short pulse is generated as the output signal (OUT2) 40 of the NOR circuit 36. Moreover, at the falling edge of the input signal (IN) 33, the level change in the input signal (IN) 33 is applied to the input side of the NOR circuit 35. Along with this, the inverted output inverted by the inverter 37 to the delayed output of the input signal (IN) 33 delayed by the delay circuit 34 is applied to the input side of the NOR circuit 35, so that a short pulse is generated as the output signal (OUT1) 39 of the NOR circuit 35. Here, the pulse width of the short pulse is determined by the delay time of the delay circuit 34.

The basic operation of the level shift circuit 80 will be explained by using FIG. 3 and FIGS. 4A and 4B. As shown in a waveform diagram in FIG. 4B, the change in the level of the input signal (IN) 33 from L (Low) to H (High) makes the short pulse, generated by the pulse generating circuit 32 shown in FIG. 4A, outputted as the output signal (OUT2) 40 to be inputted to the gate of the MOSFET 31 shown in FIG. 3. As a result, the MOSFET 31 is brought to a conduction state, by which the level of the input side of the inverter 24 in the latch circuit 27 is lowered to bring the level of the output signal (OUT) 41 of the latch circuit 27 to H (High) which is equal to the electric potential of the high electric potential terminal V2H 28. Moreover, as shown in a waveform diagram in FIG. 4B, the change in the level of the input signal (IN) 33 from H (High) to L (Low) makes the short pulse, generated by the pulse generating circuit 32, outputted as the output signal (OUT1) 39 to be inputted to the gate of the MOSFET 30 shown in FIG. 3. As a result, the MOSFET 30 is brought to a conduction state, by which the level of the input side of the inverter 23 in the latch circuit 27 is lowered to bring the level of the output signal (OUT) 41 of the latch circuit 27 to L (Low) which is equal to the electric potential of the low electric potential terminal V2L 29. Therefore, the level shift circuit 80 according to the embodiment is formed such that the MOSFETs 30 and 31 are cut off when there is no change in electric potential in the input signal (IN), so as to usually consume no electric power.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. An integrated circuit comprising:
   a semiconductor substrate;
   a shielding layer;
   a circuit element formed on the shielding layer;
   a functional circuit carrying out a specified operation with the use of the circuit element; and
   an n-channel MOS transistor,
   wherein the shielding layer is connected either to a reference potential of the functional circuit or to a point having an electric potential that changes in accordance with a change in the reference potential, and the reference potential is changed by turning the MOS transistor on and off;
   wherein the MOS transistor has a drain terminal, to which an input voltage is applied, and has a gate terminal and a source terminal;
   wherein the source terminal of the MOS transistor is connected to a coil, and the coil is connected to a capacitor, to which capacitor an output voltage is applied,
   wherein the functional circuit is connected to the gate terminal of the MOS transistor, and carries out an operation with the use of the circuit element, and
   wherein the MOS transistor is driven by the functional circuit for obtaining a specified output voltage from the input voltage.

2. The integrated circuit according to claim 1, further comprising:
   a bootstrap circuit in which a reference potential thereof is taken as the electric potential of the source terminal of the MOS transistor; wherein:
   the functional circuit is operated with an electric potential of a high electric potential side of a power source thereof taken as an electric potential on a high electric potential side of the bootstrap circuit and an electric potential of a low electric potential side of the power source thereof taken as the reference potential; and
   the shielding layer is connected either to the reference potential or to the high electric potential of the bootstrap circuit.

3. The integrated circuit according to claim 2, further comprising an overcurrent protection circuit formed with a second one of the circuit element included in the integrated circuit provided for preventing an overcurrent from flowing in the MOS transistor, a reference potential of the overcurrent protection circuit being connected to the reference potential of the bootstrap circuit.

4. The integrated circuit according to claim 1, wherein the shielding layer comprises a diffused layer formed in the semiconductor substrate.

5. The integrated circuit according to claim 1, wherein the shielding layer comprises a conductive film formed on the semiconductor substrate.

6. The integrated circuit according to claim 5, wherein the conductive film is a metal film.

* * * * *